April 5, 1966  G. M. STANKIEWICZ  3,244,323
DISPATCHING SYSTEM FOR CONTROLLING AND ACCOUNTING FOR THE
LOADING OF PRODUCTS INTO TRUCKS AT A MARKETING TERMINAL
Filed Feb. 11, 1964  4 Sheets-Sheet 2

INVENTOR
GEORGE M. STANKIEWICZ

April 5, 1966 G. M. STANKIEWICZ 3,244,323
DISPATCHING SYSTEM FOR CONTROLLING AND ACCOUNTING FOR THE
LOADING OF PRODUCTS INTO TRUCKS AT A MARKETING TERMINAL
Filed Feb. 11, 1964 4 Sheets-Sheet 3

INVENTOR
GEORGE M. STANKIEWICZ

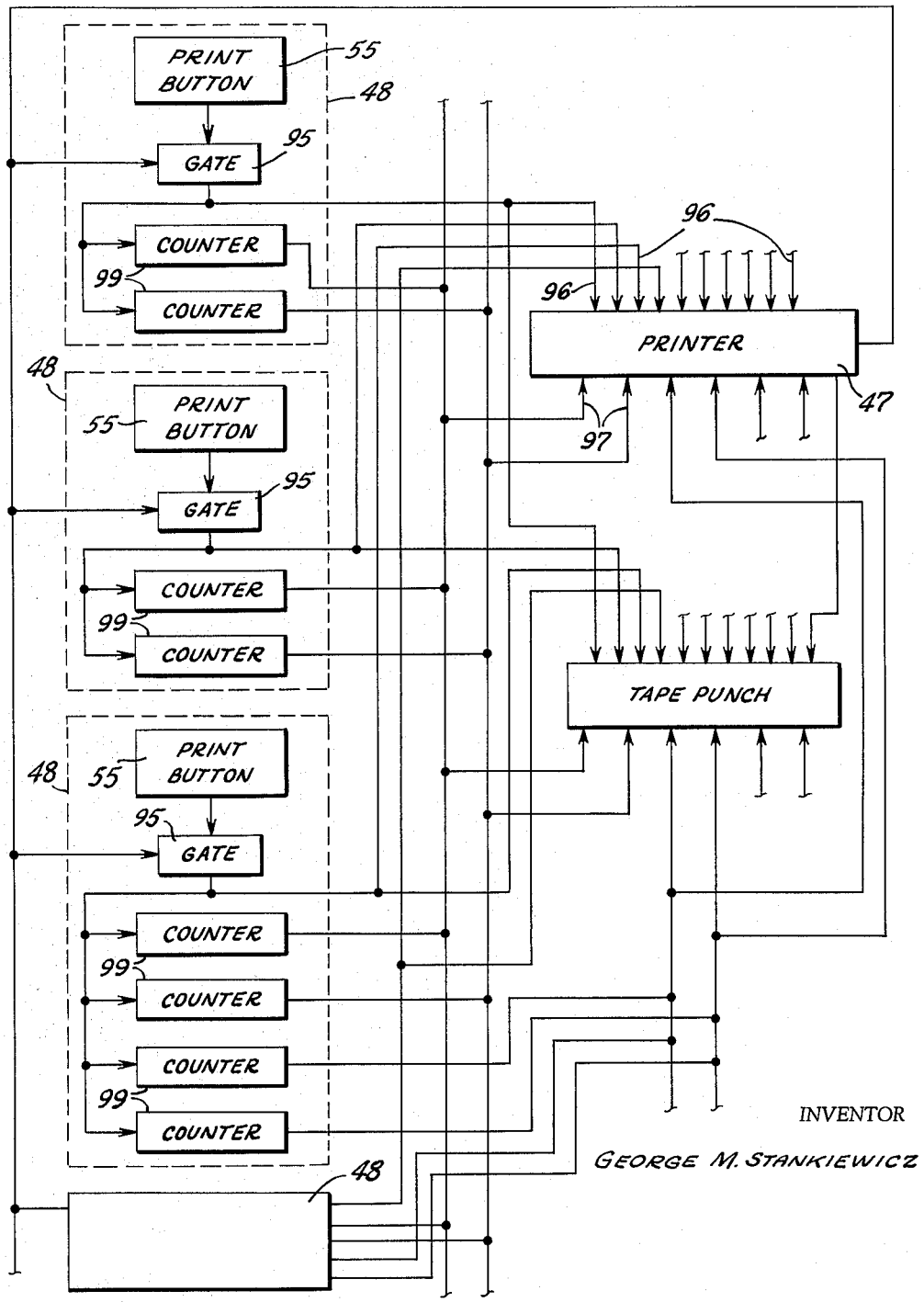

United States Patent Office 3,244,323
Patented Apr. 5, 1966

3,244,323
DISPATCHING SYSTEM FOR CONTROLLING AND ACCOUNTING FOR THE LOADING OF PRODUCTS INTO TRUCKS AT A MARKETING TERMINAL
George M. Stankiewicz, Millburn, N.J., assignor to Socony Mobil Oil Company, Inc., a corporation of New York
Filed Feb. 11, 1964, Ser. No. 344,147
7 Claims. (Cl. 222—26)

This invention relates to dispatching systems for controlling the loading of products into trucks at a marketing terminal and gathering transaction data relative to such loading for accounting purposes, and more particularly to a single printer dispatching system for light petroleum products operating in conjunction with a large number of truck loading bays.

Gasoline and other light petroleum products are stored in tanks at marketing terminals having facilities to load the products into tank trucks. When petroleum products are loaded into a truck, data must be recorded indicating the names of the products loaded, the amounts of the products loaded, the number of the bay from which the products were loaded, driver identification information and the time the products were loaded. Prior to the present invention this accounting of petroleum product dispensing from a marketing terminal was carried out by means of a system employing a large number of printers, one for each rack meter. The present invention improves over this prior art system by providing a system which has only a single printer for all of the rack meters at the marketing terminal. Because of the resulting compactness and convenience of the system, the workload on the dispatcher is greatly reduced. Moreover, the number of errors in the accounting procedure and the cost of the accounting procedure is reduced. Furthermore, the system of the present invention will easily accommodate the expansion of market terminal facilities to include additional loading bays or additional products.

Accordingly a principal object of the present invention is to provide an improved product dispatching system for market terminals.

Another object of the present invention is to reduce the workload and improve the convenience for the dispatcher at a market terminal.

A further object of the present invention is to reduce the number of errors in the dispatching procedure at a market terminal.

A still further object of the present invention is to reduce the cost of the dispensing procedure at a market terminal.

A still further object of the present invention is to record the transaction data in a form that may be readily read out and fed to data processing equipment.

Further objects and advantages of the present invention will become readily apparent as the following detailed description of the invention unfolds and when taken in conjunction with the drawings, wherein:

FIG. 4 illustrates a ticket upon which the pertinent data is recorded when a truck is loaded;

FIG. 6 is a block diagram illustrating how the printer receives the information to be printed.

Figure 1:
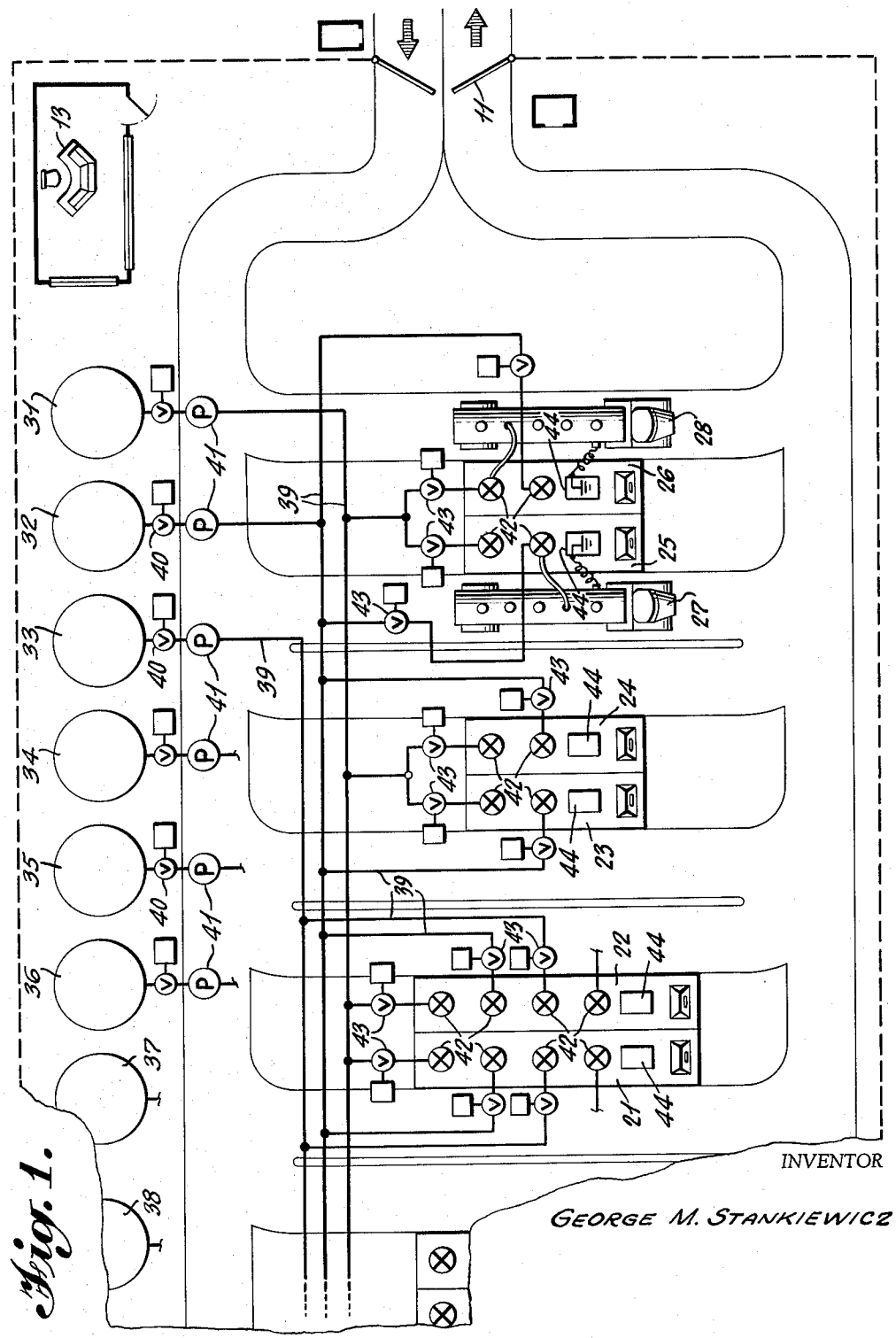
FIG. 1 illustrates a marketing terminal having a dispatching system in accordance with the present invention.

As shown in FIG. 1, a truck to be loaded enters the loading terminal through gate 11 where he communicates with the dispatcher by voice communication and identifies himself. This communication would normally be carried out telephonically. The dispatcher, who is stationed at the console 13, assigns the driver a loading bay for loading the required products into the tank truck. The driver then drives his truck to the assigned loading bay. In the terminal there are a large number of loading bays, only six of which are illustrated in FIG. 1. The illustrated loading bays in FIG. 1 are designated by the reference numbers 21 through 26. Two tank trucks 27 and 28 are shown being loaded at the bays 25 and 26, respectively. The loading bays are normally arranged in pairs as shown in FIG. 1 with the loading position for one truck being on one side of a pair of loading bays and the loading position for the other truck being on the other side of the pair of loading bays. A pair of loading bays arranged in this manner is referred to as a loading rack. Thus there are three loading racks shown in FIG. 1. At the terminal are several storage tanks which store different petroleum products, such as different grades of gasoline, heating oil, diesel fuel, etc. Eight of the storage tanks are illustrated in FIG. 1 and are designated 31 through 38. Underground conduits 39 connect the storage tanks to dispensers at the loading bays for loading the products stored in the tanks into trucks. Not all the loading bays can dispense the same products and some loading bays can dispense more products than others. For example, the storage tanks 31 and 32 are connected to dispensers at all of the loading bays 21 through 26. The storage tank 33 is connected to dispensers at the loading bays 21 and 22 but not at the loading bays 23–26. Thus if a tank truck arrived at the marketing terminal to receive the product stored in the tank 33, the dispatcher would not send this tank truck to any one of the loading bays 23–26 but would send it to one of the loading bays 21 or 22 or some other loading bay to which the tank 33 is connected.

Valves 40 are provided at the outlet of each of the storage tanks to control the flow of petroleum products out of the storage tanks into the conduits 39. Pumps 41 are provided at the outlets of the tanks to pump the petroleum products through the conduits 39 to the dispensers at the loading bays. Rack meters 42 are provided at the loading bays to measure the amounts of the petroleum products dispensed into the tank trucks. At each loading bay a rack meter is provided for each product that can be dispensed from the loading bay. The rack meters are of the conventional type producing one output pulse for each gallon of petroleum product dispensed. The pulses produced by the rack meters are counted by counters in the console 13 and in this manner the number of gallons of each product loaded is determined. Valves 43 are provided at the loading bays to control the flow of the petroleum products to the dispensers at the loading bays. The reference numbers 44 designate the apparatus for grounding the tank trucks while they are being loaded.

After the driver of the truck has positioned his truck at the loading bay assigned by the dispatcher, he connects the dispenser hoses to the truck, grounds the truck and performs all the other necessary safety procedures. The dispatcher will receive indication that the grounding has been completed by the driver and will then press buttons for the release of the products to be dispensed at the loading bay. This action will open the appropriate valves 43 at the loading bay and permit the selected products to flow to the dispenser and be loaded into the truck. The driver is then able to proceed with his loading until it is completed. After the loading of the truck is completed, the driver will disconnect the ground connection which will cause an indicator light to flash on at the console 13 indicating to the dispatcher that the loading has been completed. The dispatcher then prints the required transaction data on a ticket, a copy of which is received by the driver, who then drives away his loaded truck.

Figure 2:
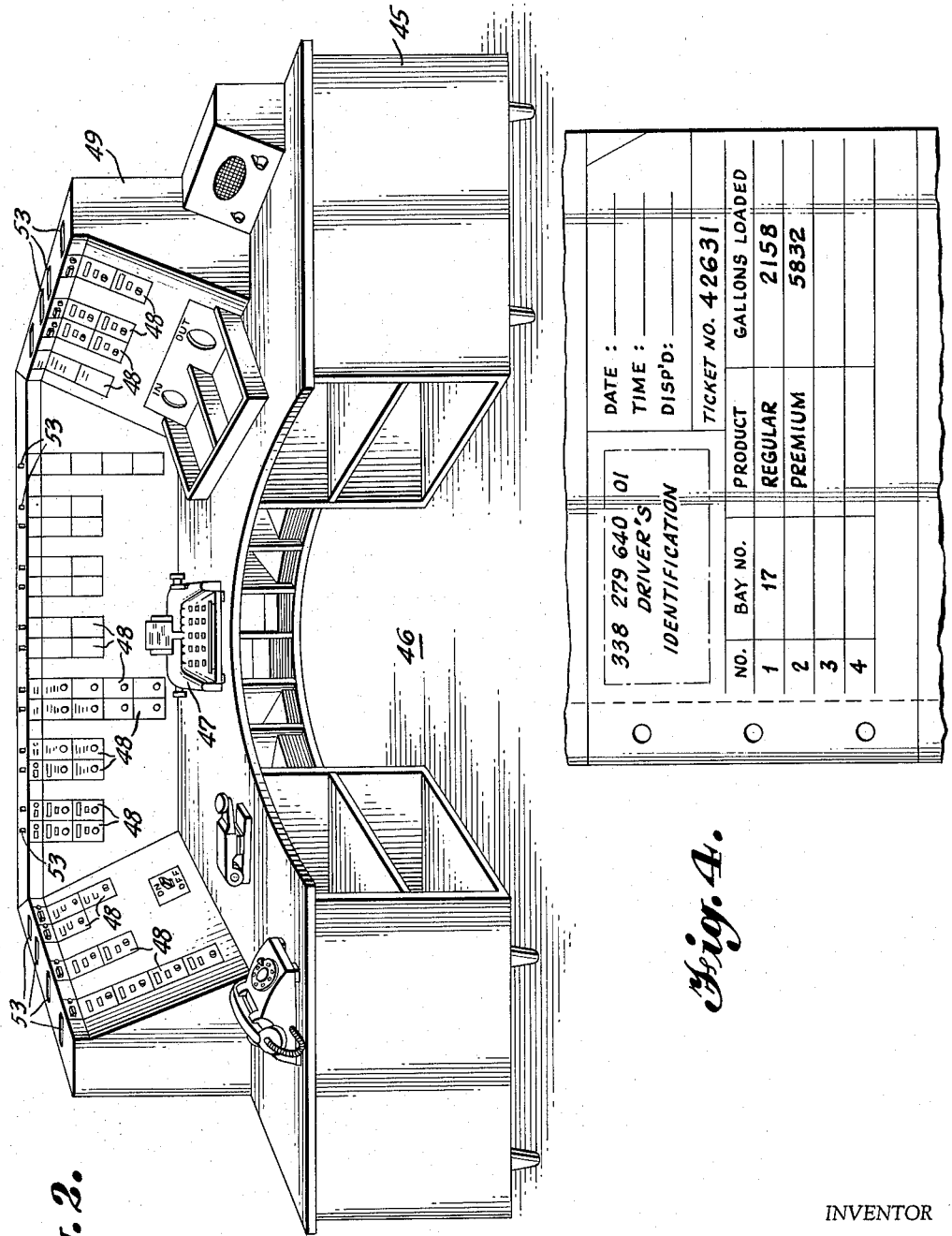
FIG. 2 illustrates a console used in the dispatching system of the present invention.
Figure 3:
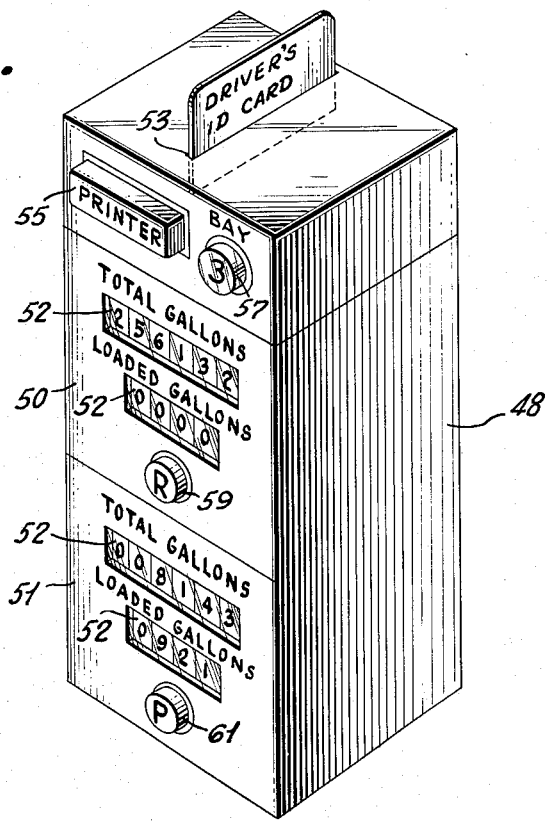
FIG. 3 illustrates a control stack used to control and account for the operation at a loading bay.

The console at which the dispatcher is stationed as shown in FIG. 2 comprises a large desk 45 with a semicircular space 46 in the center in which the dispatcher can sit or stand. On the center of the desk is the single printer 47 of the dispatching system. A large number of control stacks 48, one for each loading bay, are mounted in an upright control panel 49 and are arranged around the semicircular space 46 for the dispatcher. One of the control stacks 48 is shown in more detail in FIG. 3. Each control stack has a counter unit for each rack meter at its corresponding loading bay. The control stack shown in FIG. 3 is for a loading bay which has two rack meters for dispensing two products, regular grade gasoline and premium grade gasoline. Accordingly the control stack shown in FIG. 3 has two counter units 50 and 51. Each counter unit has two counters both counting pulses from the rack meter corresponding to the counter unit. One counter, referred to as the loaded gallons counter, is set back to zero after each loading and thus keeps track of the total number of gallons of the product loaded into the truck. The other counter referred to as the total gallons counter is not reset to zero and thus keeps track of the total number of gallons of the product dispensed from the loading bay corresponding to the control stack in which the counter is located. Each counter unit has visual indicators 52 to indicate the counts registered by both its loaded gallons counter and its total gallons counter. The counter unit 50 receives pulses from a rack meter measuring the amount of regular grade gasoline dispensed from a loading bay and the counter unit 51 receives pulses from a rack meter measuring the amount of premium grade gasoline dispensed from this same loading bay.

The counters together with the meters at the loading bays thus comprise means for measuring the amounts of the products that are loaded into the trucks. The counters themselves also operate as registers to register the amounts measured.

On top of each of the control stacks is a slot 53 adapted to receive a driver identification card. Near the top of each control stack is a print button 55 and an indicator light 57. Each of the counter units in each control stack is provided with a push button switch. In FIG. 3 the push button switch for the counter unit 50 is designated by the reference number 59 and the push button switch for the counter unit 51 is designated by the reference number 61. The switch 59 has an R inscribed on it for "regular" and the switch 61 has a P inscribed on it for "premium."

After a driver has identified himself to the dispatcher at the gate and the dispatcher has assigned a loading bay to the driver, the dispatcher takes the driver's identification card out of the file which is located in the desk 45 and places it in the slot 53 over the control stack correspondingly to the loading bay assigned to the driver. When the driver identification card is inserted into the slot 53, it closes a switch which action will cause the indicator light 57 on the same control stack to become energized unless the driver has already grounded his truck at the corresponding loading bay. The indicator light 57 will remain energized until the driver of the truck properly grounds the truck at the loading bay and will become energized again when the driver disconnects the ground connection from his truck at the loading bay. When the indicator light 57 goes out, indicating that the driver has properly grounded his truck at the loading bay, the dispatcher will actuate the push button switch or switches in the control stack corresponding to the assigned loading bay. The push button switches actuated will be on counter units corresponding to the rack meters measuring the products which are to be loaded into the tank truck. For example, if the control stack shown in FIG. 3 corresponds to the assigned loading bay and only regular gasoline is to loaded, then the dispatcher after the indicator light 57 goes out will actuate the push button switch 59. If only premiuum gasoline is to be loaded, the dispatcher will actuate the push button switch 61 and if both regular and premium gasoline are to be loaded, the dispatcher will actuate both the push button switches 59 and 61. With the dirver identification card in the slot 53 and the appropriate push button switches actuated, the appropriate valves 43 at the loading bay will be opened and the driver can begin loading the products. As the products are loaded, the rack meters 42 at the loading bay for these products will produce output pulses and the counters in the control stack will count the pulses produced by the rack meters. When the driver has completed his loading, he will disconnect the ground from his truck. This action will cause the indicator light 57 to again become energized thus informing the dispatcher that the loading has been completed. The dispatcher then removes the driver's identification card from the slot 53 and places it in the printer 47, together with a loading ticket. The dispatcher then actuates the print button 55 on the control stack from which he just removed the driver identification card whereupon the printer 47 will print the driver identification data, the date and time, the products loaded, the number of gallons of each of the products loaded, and the number of the loading bay from which the products were loaded. The actuation of the print button also resets the loaded gallons counters back to zero. The driver, after completing the loading operation, drives the loaded truck to the exit gate, where he stops to receive a copy of the loading ticket. The dispatcher sends the driver's copy of the loading ticket to the exit gate through a pneumatic tube conveyor provided for this purpose.

FIG. 4 illustrates an exemplary ticket on which the transaction data has been printed. As shown in FIG. 4, the driver identification data is printed in the upper left-hand corner, the date and time are printed in the upper right-hand corner and the bay number, the product identification, and the gallons loaded are printed in columns below the driver identification and the date and time. The printer prints the driver identification data from the driver identification card inserted therein. It prints the time from a clock not shown and it prints the number of gallons loaded, the names of the products loaded, and the number of the bay from which the products were loaded in response to signals applied to the printer from the control stack correspondingly to the loading bay from which the products were loaded.

Figure 5:
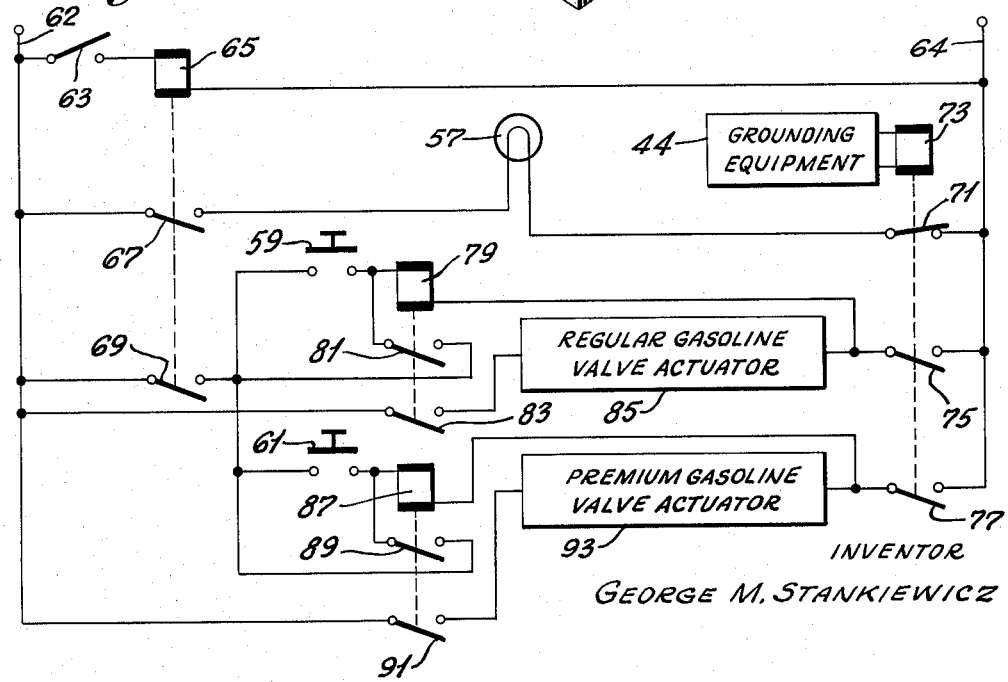
FIG. 5 is a circuit diagram showing how a control stack controls the dispensing at a loading bay.

FIG. 5 illustrates a circuit showing how the control stack shown in FIG. 3 controls the dispensing at its corresponding loading bay. Each of the other control stacks will control its corresponding loading bay in a similar manner. Power is applied to the circuit shown n FIG. 5 between lines 62 and 64. When a driver identification card is inserted in the slot 53 of the control stack shown in FIG. 3, it will close the switch 63. When the switch 63 closes, it completes an energization circuit between lines 62 and 64 for a relay solenoid 65, which thereupon closes normally open contacts 67 and 69. When the contacts 67 close, they complete an energization circuit for the indicator light 57 of the control stack shown in FIG. 3 through normally closed contacts 71, which are controlled by a relay solenoid 73. When the driver has properly grounded his truck at the loading bay corresponding to the control stack shown in FIG. 3, the grounding equipment 44 at this loading bay will energize the relay solenoid 73 which, when energized, will open the contacts 71. Thus the indicator light 57 will go out, informing the dispatcher that the driver has properly grounded his truck at the assigned loading bay. The relay solenoid 73 also controls two sets of normally open contacts 75 and 77 and when energized the relay solenoid 73 closes these contacts. As pointed out above, if regular gasoline is to be loaded, the dispatcher will actuate the push button switch 59 after the indicator light 57 goes out. When the push button switch 59 closes, an energization circuit will be completed for a relay solenoid 79 over the switch 59, the contacts 69 and the contacts 75. The solenoid 79 will then become energized and close its normally open contacts 81 and 83. It will be noted that the solenoid 79 will not become energized when the switch 59 is actuated if either the driver identification card is not in the slot 53 resulting in the contacts 69 being open or the truck is not properly grounded by means of the equipment 44 resulting in the contacts 75 being open. The contacts 81 close a holding circuit for the relay solenoid 79 so as to keep the solenoid 79 energized after the push button switch 59 is released. The contacts 83 upon closing complete an energization circuit to a valve actuator 85 over the now closed contacts 75. Upon being energized the valve actuator 85 will open the valve 43 controlling the flow of regular gasoline to the dispenser at the loading bay corresponding to the control stack shown in FIG. 3. Thus the driver will be able to load regular gasoline into his truck at this loading bay. It will be noted that if the truck is not properly grounded with the grounding equipment 44 resulting in the switch 75 being open, the regular gasoline valve actuator 85 cannot be energized and the corresponding valve 43 will not open. As pointed out above, if premium gasoline is to be loaded, then the dispatcher after the indicator light 57 goes out will actuate the push button switch 61, which upon closing will complete an energization circuit for a relay solenoid 87 over the switch 61 and the contacts 69 and 77. The solenoid 87 will then become energized and close its normally open contacts 89 and 91. It will be noted that the relay solenoid 87 will not become energized when the switch 61 is actuated if either the driver identification card is not in the slot 53 resulting in the contacts 69 being open, or the truck is not properly grounded by means of the grounding equipment 44 resulting in the contacts 77 being open. The contacts 89 close a holding circuit for the relay solenoid 87 so as to keep the solenoid 87 energized after the push button switch 61 is released. The contacts 91 upon closing complete an energization circuit to a valve actuator 93 over the contacts 77. Upon being energized the valve actuator 93 will open the valve 43 controlling the flow of premium gasoline to the dispenser at the loading bay corresponding to the control stack shown in FIG. 3. Thus the driver will then be able to load premium gasoline into his truck at this loading bay. It will be noted that if the truck is not properly grounded with the grounding equipment 44, resulting in the switch 77 being open, the premium gasoline valve actuator 93 cannot be energized and the corresponding valve 43 will not open. When the driver has completed the loading of his truck he will disconnect the ground from his truck. This will cause the relay solenoid 73 to de-energize and the contacts 75 and 77 will open. As a result the valve actuators 85 and 93 will be de-energized and will close the corresponding valves 43. The opening of the contacts 75 and 77 will also interrupt the holding circuits for the relay solenoids 79 and 87 causing these relay solenoids to become de-energized. The removal of the driver's card from slot 53 will cause the relay solenoid 65 to become de-energized and cause the contacts 67 and 69 to open. The opening of the contacts 69 will also de-energize the holding circuit for the relay solenoids 79 and 87. If at any time while the driver is loading his truck the ground to the truck should become disconnected, the relay 73 would become de-energized and the contacts 75 and 77 would open. As a result the valves 43 at the loading bay would close cutting off the flow of gasoline into the truck.

In order to proceed with the loading after such an occurrence it would be necessary for the dispatcher to again actuate one or both of the push button switches 59 and 61, depending upon what products are being loaded. Each of the loading bays is controlled by its corresponding control stack in a manner similar to that described with respect to FIG. 5. Each of the valves 43 at a particular loading bay will have a valve actuator controlled by a circuit configuration the same as those used for the valve actuators 85 and 93.

FIG. 6 is a circuit showing how the control stacks 48 cooperate with the printer 47. When the print button 55 in a control stack 48 is actuated, it will apply a signal to a gate 95 which will be normally enabled. The signal upon passing through the gate 95 will be applied directly to the printer 47 with the signal from each control stack 48 coming from its gate 95 being applied to a different input channel 96 of the printer 47. Upon receiving this signal from any one of the control stacks 48, the printer 47 will begin its printing operation and will produce an output signal disabling all of the gates 95 in all of the control stacks for the duration of the printing operation. In this manner the printer operates to accept information from only one of the control stacks 48 at a time. The printer 47 has a plurality of information input channels 97 one for each product which can be dispensed from the marketing terminal. These input channels 97 are connected to the loaded gallons counters in the control stacks 48. In FIG. 6 these loaded gallons counters are designated by the reference numbers 99. All of the loaded gallons counters 99 corresponding to different products will be connected to different information input channels 97 and all of the loaded gallons counters 99 corresponding to the same product will be connected to the same input channel 97. When the print button 55 in a control stack is actuated, the resulting signal passing through the gate 95 in this control stack will be applied to all of the loaded gallons counters 99 in the control stack. The loaded gallons counters 99 in response to receiving such a signal will send signals representing the counts registered therein to the input channels 97 to which the counters 99 are connected, unless the count registered therein is zero. If a counter has a zero count registered therein as it would if none of its product has been loaded into the truck at the corresponding loading bay, then it will send no signals to the printer 47. The applied signal from the print button 55 will also set the loaded gallons counters 99 to zero. The printer 47 in response to the signals applied at input channels 97, will print the counts registered in the counters from which the signals were sent. In this manner the printer 47 prints the number of gallons loaded of each product loaded into the truck. Each of the input channels 97 may comprise several signal lines if the signals representing the digits of the counts are transferred from the counter 99 in parallel or they may each comprise a single line if the signals representing the digits of the counts are transferred serially.

As explained with reference to FIG. 4, the printer 47 also prints the name of each product loaded alongside of the number of gallons of the product loaded. The printer determines what product name to print from the input channel 97 on which the signals representing the registered count are received. For example, if the signals are received in the channel 97 which is connected to the loaded gallons counters for regular gasoline, then in response to receiving signals on this channel the printer 47 will print the name "Regular," or equivalent code letter "R," alongside of the count represented by the applied signals. Likewise if these signals are received on the input channel 97 connected to all the loaded counters for premium gasoline, then the printer 47 in response to receiving signals on this input channel will print the word "Premium," or equivalent code letter "P,"

alongside of the number represented by the applied signals. In this manner the printer 47 prints the name of each product loaded and the number of gallons of each product loaded from a loading bay in response to the print button 55 at the corresponding control stack being actuated. The printer 47 also prints the number of the loading bay at which the products were loaded. The printer 47 prints the loading bay number in response to receiving a signal on one of the input channels 96 and determines which bay number to print by the input channel 96 on which it receives a signal. In this manner the printer 47 prints the necessary transaction data. The signals from the control stacks 48 are also fed to a tape punch 101 in addition to the printer 47. The purposes of the tape punch 101 is to store the transaction data that is printed on the loading ticket in machine language form so that the transaction data may be later fed to data processing equipment for producing the reports and summaries which are required by accountants.

When the print button 55 on a control stack 48 is actuated, the resulting output signal from the gate 95 in this control stack is also applied to the tape punch 101. The tape punch 101 upon receiving a signal from the gate 95 in one of the control stacks 48 will begin the tape punching operation and will punch a code on the tape representing the number of gallons of each product loaded and identifying each product and the loading bay from which the product is loaded. Like the printer 47 the tape punch determines the product identification from the input channel on which the signals applied from the counters 99 are received and identifies the loading bay from the input line on which the enabling signal from the gate 95 is applied. In addition to storing this information the tape punch 101 also reads out the coded information on the driver identification card inserted in the printer and punches a corresponding code on the tape and punches a code representing the date and time. In this manner all the information printed on the loading ticket is stored on a punched tape which can be used to feed the transaction data to a data processing machine.

Instead of printing the number of loaded gallons, the system could be adapted to print the count registered by the total gallons counter prior to loading and after loading. Also the operation carried out by the dispatcher could be made automatic. Moreover, the information printed on the ticket could be directly transmitted to a central accounting office and to data processing equipment. These and many other modifications may be made to the above described specific embodiment of the invention without departing from the spirit and scope of the invention which is defined in the appended claims.

What is claimed is:

1. A dispatching system comprising a plurality of loading bays each including dispensing means to load a product into trucks, a plurality of measuring means, one for each of said bays to measure the amount of each product loaded into a truck at such bay, said measuring means including a plurality of registers, one for each of said measuring means to register the amount measured thereby, recording means connected to receive signals representing the amount registered in each of said registers and operable to record the amounts represented by such signals received from said registers in a form adapted to be read out and transmitted, and control means operable when actuated to cause said registers to send signals representing the amounts registered therein to said recording means to be recorded thereby.

2. A dispatching system comprising a plurality of loading bays each including dispensing means to load a product into a truck, a plurality of measuring means, one for each of said bays to measure the amount of product loaded into a truck at such bay, said measuring means including a plurality of registers, one for each of said measuring means to register the amount measured thereby, a printer connected to receive signals representing the amounts registered in each of said registers and operable to print the amounts represented by signals received from said registers, and a control means for each of said measuring means operable when actuated to cause the register of such measuring means to send signals representing the amount registered by such register to said printer to be printed thereby.

3. A dispatching system comprising a plurality of loading bays each including dispensing means to load a plurality of products into trucks, a plurality of measuring means one for each of said loading bays to measure the amount of each product loaded into a truck at such loading bay including registers to register the amounts measured, a console having a plurality of units one for each of said measuring means, each of said units having mounted therein the registers of its corresponding measuring means, a printer on said console connected to receive the signals representing the amounts registered in each of said registers and operable to print the amounts represented by signals received from said registers, and a control means on each of said units operable when actuated to cause the registers mounted in such unit to send signals representing the amounts registered therein to said printer to be printed thereby.

4. A dispatching system comprising a plurality of loading bays including dispensing means to load products into trucks, at least some of said loading bays each including dispensing means to load a plurality of products, a plurality of measuring means, one for each of said loading bays to measure the amount of each product loaded into a truck at such bay including registers to register the amounts measured, each of said measuring means including a different register for each product that can be loaded from the loading bay corresponding to such measuring means, a printer connected to receive signals representing the amounts registered in each of said registers and operable to print the amounts represented by signals received from said registers and the names of the products corresponding to the registers from which the signals are sent, and control means operable when actuated to cause said registers to send signals representing the amounts registered therein to said printer to be printed thereby.

5. A dispatching system comprising a plurality of loading bays each including dispensing means to load a product into a truck, a plurality of measuring means, one for each of said loading bays to measure the amount of the product loaded into a truck at such loading bay, said measuring means including a plurality of registers, one for each of said measuring means to register the amount measured by such measuring means, means defining a plurality of receivers for driver identification cards, one receiver for each of said measuring means, a plurality of valve means one for each of said loading bays operable in response to a driver identification card not being in the receiver for the measuring means for such loading bay to prevent any product from being dispensed from such loading bay, a printer having a receiver for a driver identification card, connected to receive signals representing amounts registered in said registers, and operable to print driver identification data from the driver identification card inserted into its receiver and to print the amounts represented by signals received from said registers, and control means operable when actuated to cause said registers to send signals representing the amount registered therein to said printer.

6. A dispatching system comprising a plurality of loading bays each including dispensing means to load a product into a truck, a plurality of measuring means, one for each of said loading bays to measure the amount of the product loaded into a truck at such loading bay, said measuring means including a plurality of registers, one for each of said measuring means to register the amount measured by such measuring means, means defining a plurality of receivers for holding driver identification cards in position to be observed by a dispatcher, there being one receiver for each of said measuring means, a printer having a receiver for a driver identification card, connected to receive signals representing amounts registered in said registers, and operable to print driver identification data from a driver identification card inserted into its receiver and to print the amounts represented by signals received from said registers, and control means operable when actuated to cause said registers to send signals representing the amounts registered therein to said printer.

7. A dispatching system comprising a plurality of loading bays each including dispensing means to load a product into a truck, a plurality of measuring means, one for each of said loading bays to measure the amount of the product loaded into a truck at such loading bay, said measuring means including a plurality of registers, one for each of said measuring means to register the amount measured by such measuring means, means defining a plurality of receivers for driver identification cards, one receiver for each of said measuring means, means at each of said loading bays to ground the truck being loaded, and indicating means for each of said measuring means providing a first indication in response to a driver identification card being in the receiver for such measuring means and at the same time the truck at the loading bay corresponding to such measuring means not being grounded by the grounding means at such loading bay and providing a second indication under all other conditions, a printer connected to receive signals representing amounts registered in said registers, having a receiver to receive a driver identification card, and operable to print driver identification data from a driver identification card inserted into its receiver and to print the amounts represented by signals received from said registers, and control means operable when actuated to cause said registers to send signals representing the amounts registered therein to said printer.

References Cited by the Examiner
UNITED STATES PATENTS

| | | | |
|---|---|---|---|
| 2,540,617 | 2/1951 | Hazard | 222—30 X |
| 2,540,618 | 2/1951 | Hazard | 222—30 X |
| 2,612,288 | 9/1952 | Hazard | 222—30 X |
| 3,099,366 | 7/1963 | Reilly | 222—30 X |

M. HENSON WOOD, JR., *Primary Examiner.*

LOUIS J. DEMBO, *Examiner.*